United States Patent [19]

van der Scheer

[11] Patent Number: 4,581,043
[45] Date of Patent: Apr. 8, 1986

[54] COMPOSITE DENSE MEMBRANE

[75] Inventor: Albert van der Scheer, Amsterdam, Netherlands

[73] Assignee: Shell Oil Company, Houston, Tex.

[21] Appl. No.: 634,849

[22] Filed: Jul. 26, 1984

[30] Foreign Application Priority Data

Aug. 2, 1983 [GB] United Kingdom ............... 8320796

[51] Int. Cl.$^4$ .............................................. B01D 53/22
[52] U.S. Cl. .......................................... 55/16; 55/158
[58] Field of Search ............... 55/16, 158; 210/500.2; 427/38, 40, 41, 196, 407.2, 412.3, 412.5; 428/36, 304.4, 315.5, 315.7, 316.6

[56] References Cited

U.S. PATENT DOCUMENTS

| 3,518,108 | 6/1970 | Heiss, Jr. et al. | 427/41 |
|---|---|---|---|
| 3,620,895 | 11/1971 | Bailey et al. | 55/158 X |
| 3,717,525 | 2/1973 | Bühemann | 55/158 X |
| 3,767,737 | 10/1973 | Lundstrom | 55/158 X |
| 3,847,652 | 11/1974 | Fletcher et al. | 427/41 |
| 4,163,725 | 8/1979 | Sano et al. | 427/40 X |
| 4,199,448 | 4/1980 | Johnson et al. | 427/41 X |
| 4,214,020 | 7/1980 | Ward et al. | 55/158 X |
| 4,230,463 | 10/1980 | Henis et al. | 55/68 X |
| 4,260,647 | 4/1981 | Wang et al. | 427/41 X |
| 4,470,831 | 9/1984 | Hirose | 55/158 |

FOREIGN PATENT DOCUMENTS

| 92417 | 10/1983 | European Pat. Off. | 55/158 |
|---|---|---|---|
| 99432 | 2/1984 | European Pat. Off. | 55/158 |
| 122906 | 7/1982 | Japan | 55/158 |
| 2089285 | 6/1982 | United Kingdom | 55/158 |

Primary Examiner—Robert Spitzer

[57] ABSTRACT

Composite dense membranes are described comprising (1) a dense ultrathin selective film of a silicon-free polymerizate, (2) a dense, highly permeable intermediate layer formed by conventional polymerization fluids, e.g., gases may be selectively separated using such a composite dense membrane and (3) a microporous substrate supporting the plasma polymerizate film and the intermediate layer.

14 Claims, No Drawings 4,581,043

COMPOSITE DENSE MEMBRANE

FIELD OF THE INVENTION

This invention relates to composite dense membranes and to a process for selectively separating fluids using such composite membranes.

BACKGROUND OF THE INVENTION

A membrane can be defined as a barrier separating two fluids, which barrier prevents hydrodynamic flow therethrough, so that transport between the fluids is by sorption and diffusion. The driving force for transport through the membrane is pressure, concentration or a combination of both. During operation permeate molecules dissolve into such a membrane at its upstream surface followed by molecular diffusion down its concentration gradient to the downstream face of the membrane. At the downstream face of the membrane the permeate is evaporated or dissolved into the adjacent fluid phase. The property of the membrane describing the rate of transport is called its permeability.

The importance of membranes in chemical technology for separating liquid and/or gaseous components from one another is rapidly growing, since the membrane permeation process is particularly useful as a separation technique whenever conventional separation methods cannot be used economically to get reasonable separation. Separation by means of membranes has a further advantage in that the components to be separated are not subjected to thermal loads and not changed in chemical structure.

Membranes can be distinguished as to their microstructural forms in porous ones and non-porous or dense ones. Membranes are usually nominated as porous when they contain voids that are large in comparison with their molecular dimensions of permeates. Transport of permeates occurs within the pores of such membranes. Porous membranes have high transport rates which, however, is accompanied with a very poor selectivity for small molecules, and therefore less suitable for gas separation techniques.

Dense membranes, on the other hand, have the ability to transport species selectively and are therefore applicable for molecular separation processes, such as gas purification. With such dense membranes, even molecules of exactly the same size can be separated when their solubilities and/or diffusivities in the membrane differ significantly. A problem with dense membranes is the normally very slow transport rates. To attain acceptable transport rates, required for commercial application in separation processes where productivity is of paramount concern, it is necessary to make such membranes ultrathin. This can be construed from the following equation applicable for gas separation $$N = P \frac{(p_1 - p_2)}{L}$$

wherein
N represents the permeation rate,
P is the permeability, i.e. product of solubility and diffusivity,
$(p_1 - p_2)$ is the pressure difference over the membrane, and
L is the membrane thickness.

Similar equations are known for solid/liquid, liquid/liquid and gas/liquid separation by means of dense membranes From the above it will be clear that the rate of permeation per unit surface for a given material of the membrane and a given permeate depends upon the thickness of the membrane.

Various techniques are known for producing very thin membranes. The most common methods are melt extrusion, calendering and solvent casting. Melt extrusion should be carried out with rather complex equipment and it sets requirements, among others, thermal stability, to the material to be extruded. Calendering doe not permit the production of membranes with a thickness less than about 50 µm. A more preferred production method is solvent casting, which involves forming a solution of the membrane material, normally consisting of a polymer, and casting it onto a liquid substrate to produce a thin liquid film which is dried so that a solid membrane film is formed. To provide mechanical strength to the membrane, the film is normally arranged on a porous substrate, which may have any suitable configuration such as a flat plate or a hollow fiber. In another more preferred production method, a membrane is formed by plasma polymerization on a porous substrate. Plasma polymerization is a process wherein organic monomers are introduced into a space filled with a plasma, whereby the organic monomers are activated for example by applying an electric field and are converted into radicals or ions to effect polymerization. Membranes comprising one or more layers of plasma polymerizate can be made to have a very high selectivity. The permeability of such a membrane is, however, very poor. The porous substrate may be a sintered material, woven or nonwoven fibers, or a porous polymer film.

With the above known methods dense membranes can be produced with a very small thickness of only some nanometers. Although the membrane films can be so produced that they have a high selectivity, essential for a proper gas separation process, in combination with a reasonable permeability rate, essential from economical point of view, the porous substrate, necessary for giving the membrane film sufficient mechanical strength, forms a serious impairment of the permeability of the whole membrane structure. The pores in the porous substrate should be sufficiently small so that there is no risk of the membrane film tending to sag into or rupture adjacent to these pores during the use of the membrane. For supporting a membrane film with a thickness of about 0.1 µm, the porous substrate pores should be not greater than about 0.5 µm. If the pores are however very small, they will tend to impede flow through the porous substrate merely as a result of their size.

The amount of permeation through a membrane with a given composition does not only depend upon the thickness of the membrane but also upon its area. If a membrane film is arranged on a porous substrate, the area for gas transport is determined by the total area of the pores at the surface of the substrate and is therefore substantially smaller than the area of the membrane film.

It has been proposed to facilitate movement of water molecules from the surface of a water-absorbing reverse osmosis membrane film into a porous substrate layer by interposing a hydrogel layer capable of absorbing a substantial amount of water between the membrane film and the substrate layer. The thickness of such a hydrogel layer may vary considerably, depending on its liquid (usually water) content, which is likely to pose problems with regard to the continuity of the membrane film which is attached to the hydrogel layer and with regard to the performance of the membrane system in the absence of liquids.

SUMMARY OF THE INVENTION

The principal object of the present invention is to overcome the above-noted disadvantages adhering to known membranes formed by a dense membrane film supported on a porous substrate. Another object is to provide membrane systems which are stable and durable, independent of the presence of liquids.

DESCRIPTION OF THE PREFERRED EMBODIMENT

In accordance with the present invention this objective is achieved by providing a dense membrane, comprising (1) a dense ultrathin selective film of a plasma polymerizate, (2) a dense, highly permeable intermediate layer, and (3) a microporous substrate supporting the plasma polymerizate film and the intermediate layer.

The expression "conventional polymerization" as used herein does neither include formation of hydrogels or hydrogel-forming polymers nor plasma polymerization.

The dense, highly permeable intermediate layer in between the selective film of plasma polymerizate and the porous substrate serves two purposes, viz., support of the polymer film and distribution of fluid over the porous substrate. The support function of the intermediate layer enables the application of a very thin top layer formed by a selective polymer film in combination with a substrate having pores of a size sufficiently large in order to keep the flow resistance imposed by said pores upon use of the membrane relatively small. The second function of the intermediate layer, i.e., distribution of the fluid passed through the dense selective polymer film, allows the whole area of the said latter film to be effectively used for gas separation, despite the presence of the porous substrate. The intermediate layer therefore allows at a given composition of the membrane film higher permeation rates than obtainable with known membranes with porous substrates.

The intermediate layer should have a permeability at least larger than the permeability of the dense top layer, so that the flow of permeate through the top layer is not hampered by the presence of the intermediate layer. The permeability of the intermediate layer compared to the permeability of the top layer should be chosen such that the permeate concentration difference over the top-layer is not or only marginally influenced by the presence of the intermediate layer and porous substrate. Since the intermediate layer is in itself supported on a microporous substrate the thickness of the intermediate layer can be kept very small. For the sake of permeability, the thickness of the intermediate layer is preferably smaller than about 5 $\mu$m. The minimum thickness of the intermediate layer should be so chosen as to enable the permeate to pass through said layer into the microporous substrate at a rate at least equal to the rate of permeate flow through the selective top layer. The minimum thickness as required for the permeate flow depends upon the composition of said intermediate layer and the composition of the selective top layer. In general it can be stated that the thickness of the intermediate layer should be at least 0.01 $\mu$m in order to prevent sagging of said layer into the pores of the microporous substrate.

The intermediate layer may consist of a homopolymer, a copolymer or a miscible mixture of polymers. Typical examples of polymers suitable for forming gas separation membranes are organosiloxanes such as a polydimethylsiloxane. Copolymers of siloxanes and polycarbonates are suitable.

The selective top layer of plasma polymerizate preferably has a thickness of at least smaller than about 0.1 $\mu$m in order to keep the permeation rate through said layer at an acceptable level. The composition of the plasma polymerizate should be attuned to the type of gas separation which is to be accomplished by means of the membrane. The film of plasma polymerizate may be formed from any monomeric organic compound of an ionizable nature. Suitable examples of such organic compounds are organosiloxanes and olefins. As described in European patent publication No. 21422 it is assumed that since various modes of reactions take place simultaneously in plasma polymerization the polymer film thereby obtained would have a chemical composition different from that of a polymer film formed by conventional polymerization. Differences in chemical composition may be deduced from differences in gas separation factor between normal polymer films and films of plasma polymerizate. The fact that plasma polymerizate films of a given organic compound have in general a gas separation factor superior to that of a polymer film of said compound might be explained from the complex molecular structure of plasma polymerizate films.

The porous substrate may be formed from any suitable material and may have any suitable shape. A porous polymer film can be suitably used for serving as a porous substrate for the selective top layer and the intermediate layer. The pores in the porous substrate should be relatively small for allowing support of thin films but should on the other hand be sufficiently large as to restrict flow resistance upon the passage of permeate. The pores should preferably have a diameter in the range of 1 nanometer to 1 micrometer. The surface porosity of the porous substrate should be chosen such that the permeate throughput through said substrate at least equals the permeate throughput of the selective top layer.

Membranes according to the invention having a selective top layer of a plasma polymerizate, an intermediate layer for permeate distribution and a porous substrate are suitably provided with a further dense layer on top of the selective top layer, for protecting the latter against mechanical damage. This dense protecting layer should have a high permeability but does not need to be selective. The thickness of the protective layer should preferably be chosen smaller than about 5 $\mu$m, in order to keep the permeability relatively high compared with the permeability of the selective layer. The protecting layer may consist of a homopolymer, a copolymer or a miscible mixture of polymers. In a suitable embodiment according to the invention the protecting layer has a composition identical to that of the intermediate layer.

The dense intermediate layer and the dense protecting layer may suitably be produced according to the method as described in copending patent application (K-4684), Ser. No. 685,665, filed Dec. 24, 1984. According to this method a solution of a polymer is spread on a liquid, preferably water surface. For obtaining a dense, hole-free film on the liquid surface, the solution further contains a water-insoluble surface-active agent, such as polyisobutylene maleic anhydride with one or more polar groups. Removal of the film from the water surface may be accomplished in a known manner for example by vacuum pick-up. A microporous substrate is brought into contact with the film. The film is pulled against the surface of the microporous substrate while a vacuum is maintained. In another known manner a microporous substrate is introduced into the water support prior to the formation of a polymer film on the surface of the water support. After the polymer film has been spread over the water surface, the microporous substrate is moved towards the polymer film and withdrawn from the watersupport together with the polymer film. The selective top layer is subsequently formed on top of the intermediate layer. The protecting layer, if any, may be formed and applied onto the selective top layer in the same manner as discussed hereinabove with reference to the intermediate layer.

The invention is illustrated by the following examples.

EXAMPLE 1

A layer of plasma polymerizate was prepared by loading a gas mixture through an electric discharge chamber (forming cold plasma) over a composite membrane substrate consisting of a microporous propylene layer covered on the plasma-facing side with a dense, permeable intermediate layer of polydimethyl siloxane (prepared according to British Patent Application No. 8320797). The gas mixture comprised equal volumes of dichlorodifluor methane and argon; the experiment was carried out at room temperature.

Further reaction conditions were:

| | |
|---|---|
| used volume of the gas mixture | $0.4 \cdot 10^{-6}$ Nm$^3$ (= 0.4 cm$^3$) |
| chamber pressure | 5 Pa (= 0.05 mbar) |
| AC voltage for the induction coil | 30 V |
| frequency | 5 MHz |
| duration of experiment | 450 s |

The resultant composite dense membrane was tested at a gas feed pressure of 500 kPa (=5 bar abs.) on one side of the membrane and atmospheric permeate pressure on the other side of the membrane. The gas permeation rate of the membrane is given in the form of a P/l-value in Table I; the selectivity indicated below is defined as the quotient of the two P/l-values.

TABLE I

| gas | P/l (Nm$^3 \cdot$ m$^{-2} \cdot$ day$^{-1} \cdot$ bar$^{-1}$) | selectivity |
|---|---|---|
| CO$_2$ | 12.9 | |
| CH$_4$ | 0.66 | 19.55 |

EXAMPLE 2

A composite membrane substrate as used in Example 1 was treated in a similar manner except for the following conditions:

| | |
|---|---|
| gas mixture | equal volumes of ethylene oxide and argon |
| used volume of the gas mixture | $0.3 \cdot 10^{-6}$ Nm$^3$ |
| chamber pressure | 8.5 Pa |
| AC Voltage | 40 V |

The resultant composite dense membrane was tested in the same manner as in Example 1 and the results are tabulated in Table II.

TABLE II

| gas | P/l | selectivity |
|---|---|---|
| CO$_2$ | 4.59 | 24.16 |
| CH$_4$ | 0.19 | |

What is claimed is:

1. A composite dense membrane comprising (1) a dense ultrathin selective film of a silicon-free plasma polymerizate, (2) a dense, highly permeable intermediate layer and (3) a microporous substrate supporting the plasma polymerizate film and the intermediate layer.

2. The composite dense membrane of claim 1 wherein the dense intermediate layer has a thickness of less than about 5 micrometer.

3. The composite dense membrane of claim 1 wherein the dense intermediate layer has a thickness in the range of about 0.01 micrometer to about 5 micrometer.

4. The composite dense membrane of claim 1 wherein the ultrathin film of silicon-free plasma polymerizate has a thickness of less than about 0.1 micrometer.

5. The composite dense membrane of claim 1 wherein the pores in the microporous substrate have a diameter in the range of 1 nanometer to 1 micrometer.

6. The composite dense membrane of claim 1 further comprising a dense, highly permeable protecting layer on top of the selective film of plasma polymerizate.

7. The composite dense membrane of claim 6 wherein the protecting layer has a thickness of less than about 5 micrometer.

8. The composite dense membrane of claim 6 wherein the protecting layer has a composition substantially equal to that of the intermediate layer.

9. The composite dense membrane of claim 1 wherein the dense ultrathin selective film is a polyolefin.

10. The composite dense membrane of claim 1 wherein the dense, highly permeable intermediate layer is a polyorganosiloxane.

11. The composite dense membrane of claim 10 wherein the polyorganosiloxane is polydimethylsiloxane.

12. The composite dense membrane of claim 1 wherein the dense, highly permeable intermediate layer is a copolymer of polyorganosiloxanes and polycarbonates.

13. The composite dense membrane of claim 1 wherein the microporous substrate is polypropylene.

14. In a process for the separation of fluids from a mixture containing at least two component fluids into two fractions, one fraction being enriched with at least one of said component fluids and the other fraction being depleted in same, the process comprising contacting the fluids mixture with a composite dense membrane wherein a pressure differential is maintained between the upstream and downstream surface of said composite dense membrane such that a portion of the mixture selectively passes through the membrane resulting in the enriched fraction being on one side of the membrane and the depleted fraction being on the other side of the membrane, the improvement comprising the use of a composite dense membrane formed from (1) a dense ultrathin selective film of a silicon-free plasma polymerizate, (2) a dense highly permeable intermediate layer and (3) a microporous substrate supporting the plasma polymerizate film and the intermediate layer.

* * * * *